Figure 1:
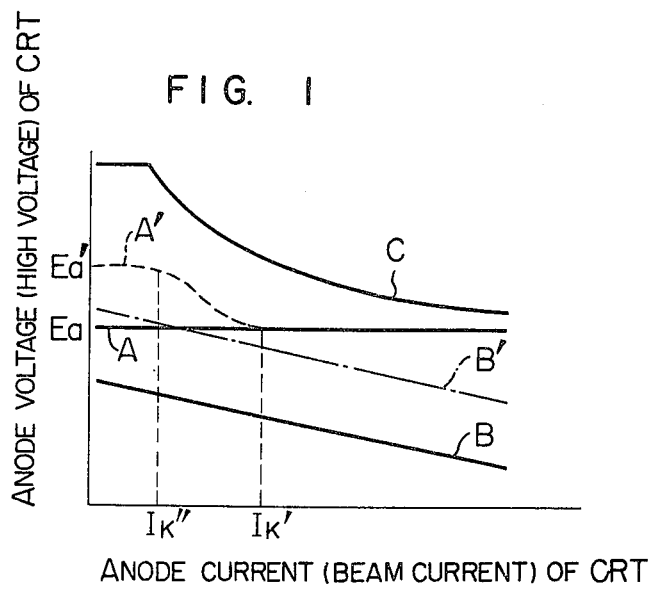

United States Patent [19]
Watanabe

[11] 4,213,166
[45] Jul. 15, 1980

[54] HIGH VOLTAGE PROTECTION CIRCUIT
[75] Inventor: Masanobu Watanabe, Yokohama, Japan
[73] Assignee: Hitachi, Ltd., Tokyo, Japan
[21] Appl. No.: 897,119
[22] Filed: Apr. 17, 1978
[30] Foreign Application Priority Data
Apr. 18, 1977 [JP] Japan .................... 52-43570
[51] Int. Cl.² .............................................. H02H 3/20
[52] U.S. Cl. ........................................ 361/86; 361/91; 358/190; 315/411
[58] Field of Search .................. 361/91, 56, 86; 358/190, 243; 315/411, 383; 328/8, 9

[56] References Cited
U.S. PATENT DOCUMENTS

| | | | |
|---|---|---|---|
| 3,745,246 | 7/1973 | Kashiwagi | 358/190 |
| 3,813,580 | 5/1974 | Norman | 361/91 X |
| 3,885,201 | 5/1975 | Fernsler | 361/91 |
| 4,010,401 | 3/1977 | Yasumatsuya et al. | 358/190 X |
| 4,045,742 | 8/1977 | Meehan et al. | 361/91 X |
| 4,126,816 | 11/1978 | Willis | 358/190 X |

Primary Examiner—Patrick R. Salce
Attorney, Agent, or Firm—Craig & Antonelli

[57] ABSTRACT

A horizontal fly-back transformer having a high voltage winding for generating high voltage pulses fed to the anode of a cathode ray tube is provided with a tertiary winding which in turn is connected to a rectifying-smoothing circuit, and a DC voltage in proportion to the anode high voltage is obtained from the rectifying-smoothing circuit. The DC voltage is divided by a resistor divider circuit and a division of the DC voltage is fed to the gate of a thyristor via a Zener diode which is turned on when the anode high voltage exceeds a critical voltage. A thryistor gate current which flow concurrent with the conduction of the Zener diode causes the thyristor to turn on so that the operating voltage o a horizontal oscillator circuit may be reduced until the horizontal oscillator circuit stops oscillating, thereby preventing generation of the anode high voltage. In addition to the aforementioned high voltage prevention circuit, a beam current detector circuit is connected in series with the high voltage winding and when the amount of beam current is below a predetermined value, detecting current dependent on the beam current is passed through a part of a resistor circuit. DC voltage for turning on the Zener diode and accordingly, the anode high voltage in proportion thereto depends on th beam current below the predetermined value so that an anode high voltage level at which the high voltage prevention circuit is operated is varied with the amount of the beam current.

7 Claims, 2 Drawing Figures

HIGH VOLTAGE PROTECTION CIRCUIT

LIST OF PRIOR ART REFERENCES (37 CER 1.56 (a))

The following references are cited to show the state of the art:
U.S. Pat. No. 3,813,580
Japanese Laid-Open Utility Model Application No. 49-4531

This invention relates to a high voltage protection circuit for a display apparatus utilizing a cathode ray tube as a television receiver set.

When the anode high voltage that is fed to the anode of a cathode ray tube is abnormally increased owing to such increase in the power supply voltage, decrease in the horizontal oscillation frequency or the like causes, X-rays harmful to the human body are radiated, as described in U.S. Pat. No. 3,813,580. According to this U.S. Pat. No. 3,813,580, and increase in the anode high voltage is detected and when the anode high voltage exceeds a predetermined value, the video signal is blanked to prevent the radiation of X-rays. Also, Japanese Laid-Open Utility Model Application No. 49-4531, laid open to public on Jan. 16, 1974, discloses an abnormal high voltage prevention circuit wherein when an abnormally high voltage is detected, a switch such as a silicon controlled rectifier which, once turned on, holds its on-state is turned on to reduce the drive voltage fed to a horizontal oscillation stage to approximate zero, thereby stopping the operation of the horizontal oscillation stage and hence the generation of horizontal fly-back pulses.

With the aforementioned prior art high voltage prevention circuits, however, a high voltage stop level by which the radiation of X-rays or the generation of abnormal high voltage is stopped, is substantially constant irrespective of the amount of beam current as shown at curve A in FIG. 1. On the other hand, beam current versus high voltage characteristic obtainable when a television receiver set is in normal operation decreases as the beam current increases as shown at curve B in FIG. 1, and an upper limit of the high voltage critical to allowable dosage of X-rays radiated from the cathode ray tube also decreases as the beam current increases as shown at cruve C in FIG. 1. Accordingly, the high voltage stop level A at which the operation is stopped is required to be set lower than the upper limit high voltage C and higher than the normal high voltage B at which the television receiver set operates normally.

While cost and productivity of the cathode ray tube impose restrictions on enhancement of the upper limit high voltage C, there has recently been a positive demand for enhancement of the normal high voltage B in order to produce a bright picture image. In making attempt to enhance the normal high voltage B to a level as shown at curve B' in FIG. 1, there arises a problem that the normal high voltage B' exceeds the high voltage stop level A with smaller beam currents and accordingly, the low brightness operation is stopped, preventing the reproduction of low brightness picture images.

Therefore, it is impossible for the prior art high voltage protection circuits, having the high voltage stop level, where the generation of high voltage or the radiation of X-rays is stopped, and where the stop level is constant irrespective of the amount of beam current to enhance the normal high voltage and to meet the requirement for bright picture.

It is an object of the invention to provide a high voltage protection circuit capable of enhancing the normal high voltage without enhancing the upper limit high voltage.

According to the invention, there is provided a high voltage protection circuit comprising stopping means detecting the high voltage when it exceeds a preset value for stopping the radiation of X-rays from a cathode ray tube, beam current detecting means detecting the beam current for generating a beam current detecting signal dependent on a detected value of the beam current, and control means responsive to the beam current detecting signal for controlling the preset value such that the preset value is decreased as the beam current increases.

Figure 2:
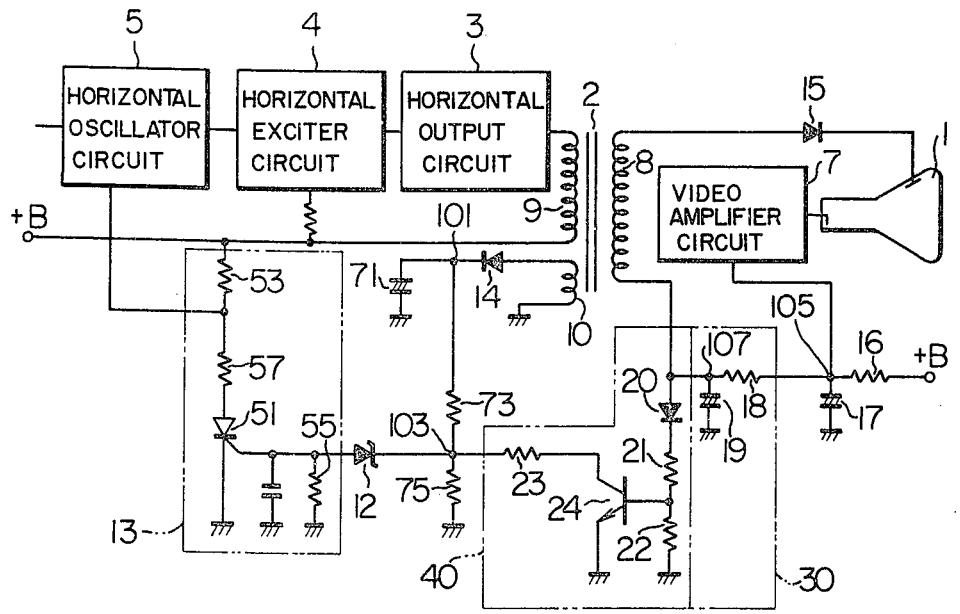

In the accompanying drawing:

FIG. 1 is a graph showing relation between the beam current and the high voltage of a cathode ray tube; and FIG. 2 is a circuit diagram of a high voltage protection circuit embodying the invention.

A high voltage circuit as diagrammatically shown in FIG. 2 comprises a cathode ray tube 1, a horizontal fly-back transformer 2, a horizontal output circuit 3, a horizontal exciter circuit 4, a horizontal oscillator circuit 5, and a video amplifier circuit 7. The horizontal fly-back transformer 2 has a primary winding 9 and a secondary, high voltage winding 8. Horizontal fly-back pulses developing across the primary winding 9 are boosted by the high voltage winding 8 and converted by a high voltage diode 15 into a DC high voltage which in turn is applied to the anode of a cathode ray tube 1. Induced across the tertiary winding 10 provided for the horizontal fly-back transformer 2 are horizontal fly-back pulses of relatively small amplitude which are in proportion to horizontal fly-back pulses developing across the high voltage winding 8. These small amplitude horizontal fly-back pulses are then converted into a DC voltage by a diode 14 and a capacitor 71. Thus, a DC voltage appearing at a joint 101 is proportioned to the high voltage fed to the cathode ray tube 1. This DC voltage is divided by a resistor divider including resistors 73 and 75. A divisional voltage appearing at a joint 103 is designed to be lower than a Zener voltage of a Zener diode 12 constituting a comparator under the normal operation. Accordingly, under the normal operation in which the Zener diode 12 is disabled, a thyristor 51 of a DC voltage control circuit 13 is disabled to that +B voltage is applied as a drive voltage via a resistor 53 to the horizontal oscillator circuit 5 to keep it in the normal operation state. However, when the DC voltages at joints 101 and 103 increase concurrently with increase in the high voltage to thereby turn on the Zener diode 12, a resistor 55 bears thereacross a voltage drop which in turn serves as a trigger voltage applied between gate and cathode of the thyristor 51, thereby turning on the thyristor 51. With the thyristor 51 turned on, +B voltage is divided by resistors 53 and 57 and the drive voltage fed to the horizontal oscillation circuit 5 is lowered to a low voltage which cannot any longer keep the horizontal oscillation circuit 5 in operation. Therefore, in the event of abnormal increase in the high voltage, the DC voltage control circuit 13 lowers the drive voltage for horizontal oscillator circuit 5, causing the horizontal oscillator circuit 5 to stop oscillating. As a result, generation of the horizontal fly-back pulses and hence of the high voltage is stopped to prevent the radiation of X-rays.

In addition to the high voltage protection circuit described above, a television receiver set commonly used has a beam current restricting circuit. The beam current restricting circuit comprises a resistor 16 inserted in a beam current flow path and a capacitor 17 for smoothing a horizontal period voltage developing across the resistor 16, whereby a DC voltage appearing at a joint 105 dependent on the beam current controls the video amplifier circuit 7 such that the beam current does not exceed a predetermined value.

According to the present invention, a circuit in FIG. 2 additionally comprises a beam current detecting circuit 30 and a preset voltage control circuit 40. A resistor 18 along with the resistor 16 is connected in series with the high voltage winding 8 and the horizontal period voltage dependent on the beam current develops at a joint 107. A capacitor 19 smoothes the horizontal period voltage appearing at the joint 107 and converts it into a DC voltage. The DC voltage appearing at the joint 107 decreases linearly from +10 volts to −1 volt, for example, as the beam current increases from zero to a maximum value (for example, 1 mA).

The preset value control circuit 40 comprises a series circuit including a diode 20 and resistors 21 and 22 connected in series between joint 107 and ground, and a transistor 24 having its base connected to a joint of the resistors 21 and 22, its collector connected via a resistor 23 to the joint 103 and its emitter connected to ground. The diode 20 is non-conductive with a low DC voltage at the joint 107 corresponding to a large beam current but becomes conductive when the DC voltage at joint 107 is enhanced with decrease of the beam current to an intermediate value of Ik mA present between zero and a maximum value. As the beam current further decreases below Ik mA to a value of Ik' mA, the transistor 24 is turned on and within a range of from Ik' mA to Ik" mA (Ik"<Ik'), collector current dependent on the beam current is passed through the resistor 73. Within a range of the beam current from zero to Ik" mA, the transistor 24 is saturated so that a constant collector current independent of the beam current is passed through the resistor 73. Since the voltage at the joint 103 is lowered, it is necessary to increase the voltage at the joint 101 or the high voltage for turning on the Zener diode 12, as compared to the case wherein the collector current does not flow through the resistor 73 at all. As the beam current decreases from the value of Ik' mA, the collector current increases from zero so that the high voltage stop level Ea at which the Zener diode 12 is turned on increases approximately up to a level of Ea' as designated at curve A' in FIG. 1 concurrently with the decrease of beam current within the range of Ik' mA to Ik" mA. For the beam current less than Ik" mA, the high voltage stop level is maintained approximately Ea'. For the beam current more than Ik' mA, on the other hand, the collector current is prevented to flow and accordingly, the high voltage stop level is maintained Ea, as in the prior art circuit.

In this manner, the circuit of FIG. 2 can change the high voltage stop level to Ea' which is higher than Ea of the prior art for the beam current around zero. Therefore, it is possible to set the operating high voltage to a curve B' without intersection of the operating high voltage B' with the high voltage stop level A', thereby ensuring much more bright pictures.

What is claimed is:

1. In a high voltage protection circuit for a television receiver including a picture tube, comprising:
    (a) periodic pulse generating means for generating a periodic pulse;
    (b) boost means for boosting said periodic pulse and for producing a D.C. high voltage for said picture tube from the thus boosted periodic pulse;
    (c) stopping means having an input terminal for rendering said picture tube inoperative to stop the radiation of harmful X-rays when a control voltage supplied to said input terminal exceeds a predetermined voltage;
    (d) rectifying means for rectifying said periodic pulse; and
    (e) supply means connected to said rectifying means for smoothing the rectified periodic pulse to produce the D.C. control voltage and for supplying said D.C. control voltage to said input terminal:
        the improvement comprising control means connected between said supply means and a beam current path of said picture tube through which a beam current of said picture tube flows for operatingly reducing said D.C. control voltage supplied to said input terminal when said beam current is less than a predetermined value, a reduced amount of said D.C. control voltage increasing in accordance with decrement in said beam current.

2. A high voltage protection circuit according to claim 1 wherein said supply means comprises a capacitor supplied with said rectified periodic pulse and a divider connected across said capacitor and having an intermediate terminal connected to said input terminal.

3. A high voltage protection circuit according to claim 2 wherein said control means comprises a variable current source whose output current is responsive to said beam current and flows through said voltage divider.

4. A high voltage protection circuit according to claim 3 wherein said control means comprises a resistor through which said beam current flows and another capacitor for smoothing a produced voltage across said resistor, said output current of said variable current source being responsive to a charge voltage in said another capacitor.

5. A high voltage protection circuit according to claim 4 wherein said variable current source comprises a transistor having a collector connected to said intermediate terminal and a base current of which transistor is supplied by said charge voltage.

6. A high voltage protection circuit according to claim 5 wherein said periodic pulse generating means generates a horizontal flyback pulse.

7. A high voltage protection circuit for a cathode ray displaying system including a cathode ray tube and high voltage generating means for generating a D.C. high voltage fed to an anode of the cathode ray tube, comprising:
    (a) high voltage detecting means connected to the high voltage generating means for generating a D.C. detecting signal representative to said D.C. high voltage;
    (b) beam current detecting means responsive to a beam current flowing through the cathode ray tube for generating a beam current detecting signal which increases in accordance with increase in a magnitude of the beam current;

(c) preset voltage control circuit including a switching element and control means, said switching element responsive only to the beam current detecting signal of the beam current detecting means for operatively providing an off state when a magnitude of the beam current detecting signal exceeds a preset value selected within a range of variation of the magnitude of the beam current detecting signal and providing an on state the conductivity of which is increased in accordance with the decrease of the magnitude of the beam current detecting signal when the magnitude of the beam current detecting signal is equal to or less than the preset value, and said control means connected to the high voltage detecting means and said switching element for generating a reference potential, the magnitude of said reference potential increasing in accordance with an increase of the D.C. detecting signal when said switching element is in said off states and the increase of the magnitude of the reference potential being suppressed in accordance with the increase of the conductivity of said switching element when said switching element is in the on state; and (d) stopping means coupled to said preset voltage control circuit and said cathode ray displaying system for generating a disabling signal which disables normal operation of said cathode ray displaying system when the reference potential exceeds a predetermined value which is representative of a preset D.C. high potential and is so selected to be less than such a reference potential which is obtained when the D.C. high voltage exceeds the preset D.C. high potential which is over a normal upper limit D.C. high potential in operation of the cathode ray tube but below a danger high D.C. potential at which X-ray may occur.

* * * * *